United States Patent [19]
Rahm

[11] Patent Number: 5,954,142
[45] Date of Patent: *Sep. 21, 1999

[54] HANDLE FOR A PNEUMATIC POWER TOOL

[75] Inventor: Erik Roland Rahm, Väsby, Sweden

[73] Assignee: Atlas Copco Tools AB, Nacka, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/817,140

[22] PCT Filed: Oct. 9, 1995

[86] PCT No.: PCT/SE95/01155

§ 371 Date: Apr. 9, 1997

§ 102(e) Date: Apr. 9, 1997

[87] PCT Pub. No.: WO96/11091

PCT Pub. Date: Apr. 18, 1996

[30] Foreign Application Priority Data

Oct. 10, 1994 [SE] Sweden ................... 9403425

[51] Int. Cl.⁶ ................... B23B 45/04
[52] U.S. Cl. ................... 173/169
[58] Field of Search ................... 173/168, 169, 173/170

[56] References Cited

U.S. PATENT DOCUMENTS

| | | | |
|---|---|---|---|
| 3,043,274 | 7/1962 | Quackenbush | 173/169 |
| 3,635,605 | 1/1972 | Hall et al. | 173/169 |
| 4,258,798 | 3/1981 | Campbell et al. | 173/168 |
| 4,265,322 | 5/1981 | Emonet | 173/169 |
| 4,778,015 | 10/1988 | Jacobsson | 173/170 |
| 5,228,523 | 7/1993 | Rahm | 173/169 |
| 5,251,367 | 10/1993 | Ward et al. | 173/169 |
| 5,687,802 | 11/1997 | Spooner et al. | 173/169 |

FOREIGN PATENT DOCUMENTS

| | | |
|---|---|---|
| 0 481 947 | 4/1992 | European Pat. Off. . |
| 0 502 363 | 9/1992 | European Pat. Off. . |
| 2 098 528 | 11/1982 | United Kingdom . |

Primary Examiner—Jessica J. Harrison
Assistant Examiner—John Paradiso
Attorney, Agent, or Firm—Frishauf, Holtz, Goodman, Langer & Chick, P.C.

[57] ABSTRACT

A pneumatic power tool includes a housing (10) with a pistol handle (11), a pneumatic motor provided in the housing (10), a pressure air inlet passage (13) and an exhaust air passage (14) extending substantially in parallel through the pistol handle (11), and a manually operable throttle valve (12) provided in the housing (10). The pistol handle (11) includes: (i) a tubular stem (20) rigidly secured to the housing (10) and forming a portion of the air inlet passage (13), (ii) a separate hollow grip element (30) surrounding at least partly the tubular stem (20) and defining together with the tubular stem (20) a portion of the exhaust air passage (14), and (iii) a clamping device (22–24,28,29) arranged to detachably secure the grip element (30) to the housing (10).

7 Claims, 2 Drawing Sheets

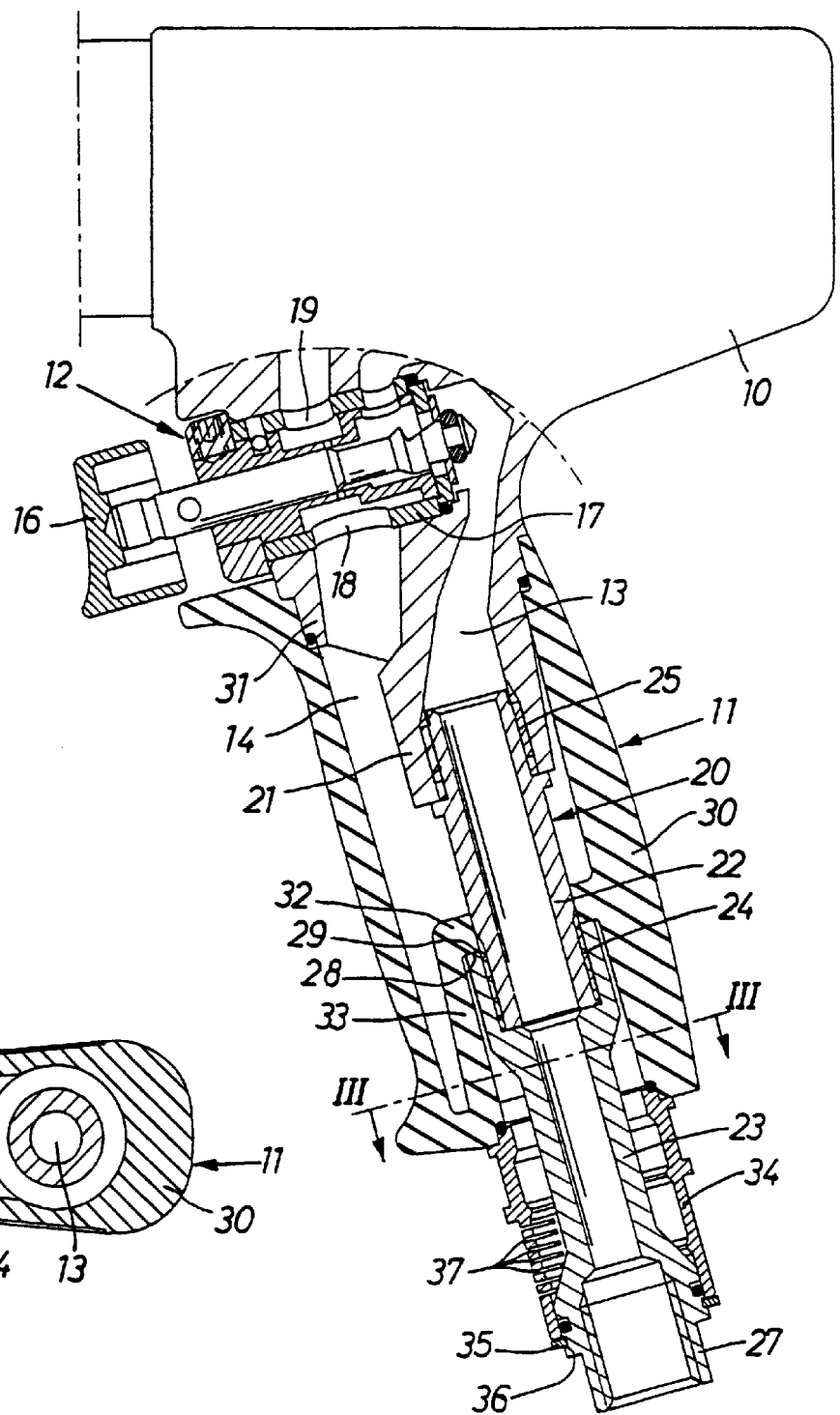
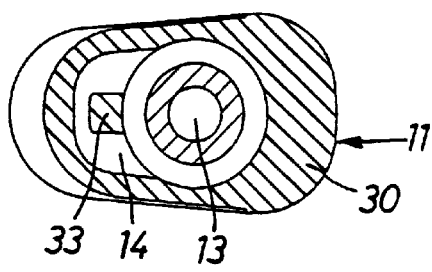

HANDLE FOR A PNEUMATIC POWER TOOL

BACKGROUND OF THE INVENTION

This invention relates to a pneumatic power tool of the type having a housing with a pistol type handle, a motor in the housing, a pressure air inlet passage and an exhaust air passage extending substantially in parallel to each other through the handle, and a manually operable throttle valve located in the air inlet passage.

In this type of power tool, as for example in the tool disclosed in GB 2 098 528, it is difficult to satisfy the demand for good heat insulation in combination with an acceptable grip size of the handle.

In a tool of the above type, the handle is formed in a heat conducting light metal alloy, and since the exhaust air passing through the handle is very cold due to previous expansion in the motor, the outer surface of the handle becomes uncomfortably cold for the operator.

In order to solve this cold problem, an insulating layer of a suitable material sometimes been applied on the outside of the handle. This adds to the grip size of the handle and makes the handling of the tool not only uncomfortable and tiresome but in some cases unsafe.

Another problem with the above type of power tool is that the grip size of the handle is not variable. This means that a comfortable handling of the tool is only available to those operators who have a certain hand size, whereas the handle is too thick for persons with smaller hands, like many female operators, but too slim for persons with big hands.

A solution to chis problem and also to the cold problem is shown in EP-A-481 947. In this publication there is described a penumatic power tool with a pistol type handle having a grip element which is easily excangeable for alternative grip elements of different sizes to suit different operators. The cold problem is solved because exhaust air does not at all pass through the handle. Instead, this known tool has a specially designed housing for communicating inlet air as well as exhaust air between a top location on the housing and the motor.

Apart from the fact that this known tool housing is more complicated and more expensive, the inlet and exhaust air passages are separated from the handle. This means that the most common and in most cases the most suitable air conduit connection and exhaust air outlet at the outer end of the handle is not possible in this prior art tool.

SUMMARY OF THE INVENTION

According to the invention, there is provided a pneumatic power tool which solves all of the above discussed problems. The invention provides a pistol type power tool which comprises a handle which not only enables good heat insulation and adaptation of the grip portion size to the operator's individual needs but which retains the conventional and simple tool housing design as well as the most desirable air inlet and outlet location at the outer end of the handle.

A preferred embodiment of the invention is described below with reference to the accompanying drawings.

BRIEF DESCRIPTION OF THE DRAWINGS

In the drawings:

FIG. 2 shows, on a larger scale, a fraction of the power tool in FIG. 1.

FIG. 3 shows a cross section along line,III=13 III in FIG. 2.

DETAILED DESCRIPTION

Figure 1:
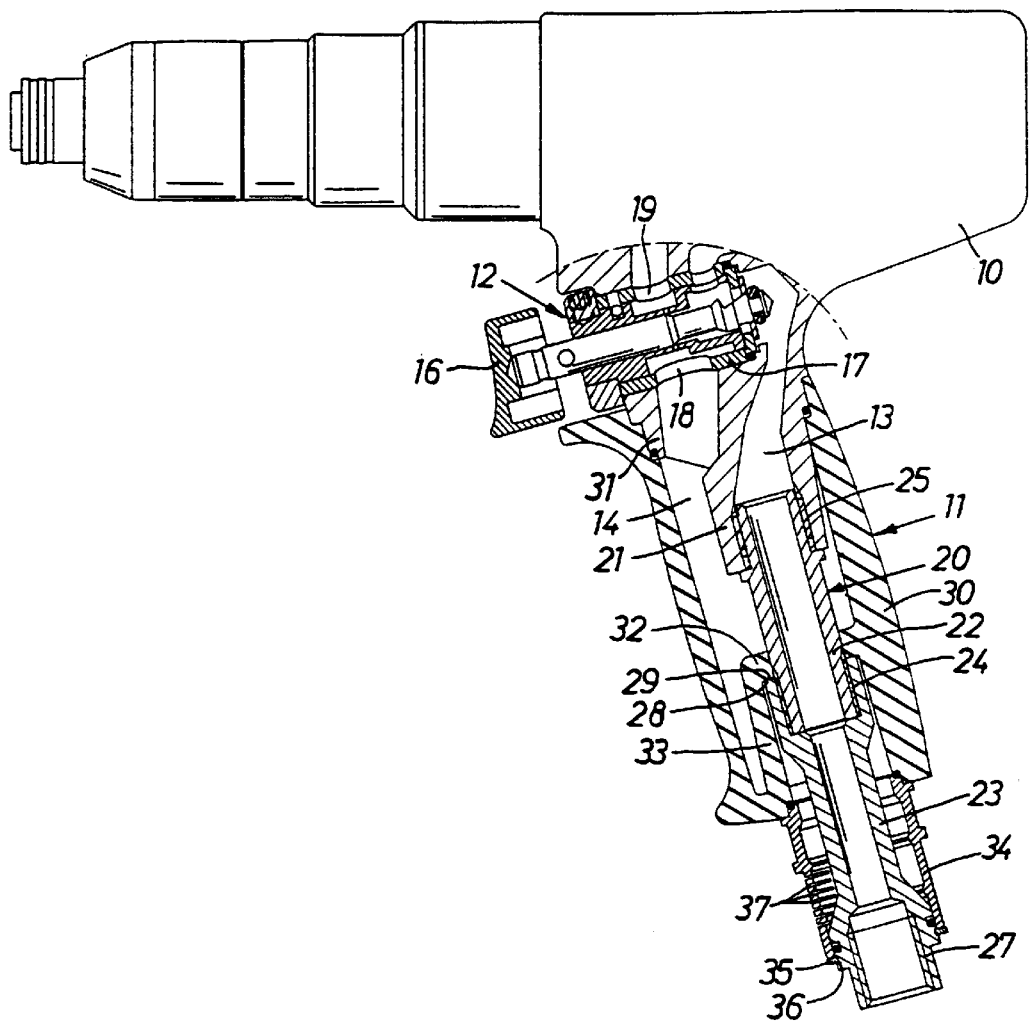
FIG. 1 shows a side view, partly in section, of a power tool according to the invention.

The power tool shown on the drawings comprises a housing 10 with a pistol type handle 11 and a throttle valve 12. Within the housing there is located a pneumatic motor (not shown) which is supplied with motive pressure air through an inlet passage 13 and which exhausts air through an exhaust passage 14. The inlet and exhaust passages 13, 14 extend substantially in parallel to each other through the handle 11.

The throttle valve 12, which is manually operable by a push button 16, forms part of the inlet passage 13. The throttle valve 12 also traverses the exhaust passage 14 and comprises an outer sleeve 17 with two lateral openings 18, 19 which form part of the exhaust passage 14.

The handle 11 comprises a central tubular stem 20 which forms a part of the inlet passage 13 and which is formed by a protrusion 21 from the housing 10 and two tube sections 22, 23 interconnected by a thread joint 24 and secured to the housing protrusion 21 by means of another thread connection 25. The outer tube section 23 is formed with a threaded socket 27 for connection of a pressure air supply conduit.

The inner end of the outer tube section 23 forms an annular shoulder 28 which engages an oppositely facing shoulder 29 on a hollow grip element 30 to firmly secure the latter to the tool housing 10. The grip element 30, which is supported on a neck portion 31 on the housing 10, surrounds the tubular stem 20 and defines together with the latter a part of the exhaust passage 14. The shoulder 29 is formed by an inner ring portion 32 of the grip element 30 and is supported on one side by a stay member 33.

A tubular outlet diffuser 34 is supported coaxially around the outer tube section 23 and is axially locked by a lock ring 35 mounted in a circumferential groove 36 in the socket 27 However, the diffuser 34, which on one side is formed with a number of outlet slots 37, is rotatable to enable change of outlet flow direction.

The grip element 30, which is easily detachable from the tool housing 10 after removal of the outer tube section 23, is molded from a heat insulating resinous material in order to protect the operator from the cold of the exhaust air.

Before leaving the tool through the outlet diffusor 34, the exhaust air from the pneumatic motor passes the throttle valve 12 via the openings 18, 19 in the sleeve 17, continues through the passage 14 formed in the grip element 30 and further into the tubular space around the outer tube section 23, and then enters the outlet diffusor 34.

The grip element 30 is not only easily detachable from the housing 10, it is also exchangeable for alternatively shaped grip elements for adaptation of the grip size and shape to different operator's needs. In other words, the grip element 30 is one of two or more interchangeable grip elements having different sizes and shapes for achieving respective different sizes and shapes of the handle grip.

I claim:

1. A pneumatic power tool comprising:

a housing;

a pneumatic motor provided in said housing;

a pistol handle extending laterally from said housing and having an inner end connected to said housing and an outer end;

a pressure air inlet passage and an exhaust air outlet passage communicating with said motor and extending substantially in parallel with each other through said pistol handle between said inner end and said outer end of said pistol handle; and a manually operable throttle valve located at said inner end of said pistol handle and forming part of said pressure air inlet passage;

wherein said pistol handle comprises: (i) a tubular central support stem rigidly secured to said housing and extending between said inner end and said outer end of said pistol handle, said support stem forming a portion of said pressure air inlet passage, (ii) a separate hollow grip element surrounding at least partly said tubular central support stem and defining together with said tubular central support stem a portion of said exhaust air outlet passage, and (iii) a clamping device arranged to detachably secure said grip element to said housing.

2. The power tool according to claim 1, wherein:

said tubular central support stem comprises at least two sections, and at least one thread connection for interconnecting said at least two sections; and said clamping device comprises a first shoulder formed on said tubular central support stem, and a second shoulder formed on said grip element and facing said first shoulder, said first and second shoulders being cooperable to transfer a clamping force onto said grip element as said thread connection is tightened.

3. The power tool according to claim 1, wherein said grip element comprises a heat insulating material.

4. The power tool according to claim 3, wherein said grip element is molded from a resinous material.

5. The power tool according to claim 1, wherein said grip element comprises one of a plurality of interchangeable grip elements each having at least one of a respective different grip size and shape.

6. The power tool according to claim 2, wherein said grip element comprises a heat insulating material.

7. The power tool according to claim 6, wherein said grip element is moulded from a resinous material.

* * * * *